United States Patent Office 3,299,026
Patented Jan. 17, 1967

3,299,026
PROCESS FOR PRODUCING AND USING A METALLOID MATERIAL AS A POLYMERIZATION CATALYST
John L. Lang, 42 Windgate Drive, Box 820–III, Murrysville, Pa. 16880
Filed Aug. 28, 1961, Ser. No. 134,256
12 Claims. (Cl. 260—93.7)

This invention relates to both apparatus and processes for preparing metalloid reductants which are particularly useful as catalyst materials in the promotion of polymerization of alpha-olefinic materials and are also useful in the preparation of organo-metallic compounds such as Grignard reagents and the like. The invention is not, however, limited to particular usages of the metalloid material once it is prepared, as will be apparent from the description of the invention.

It was previously the practice, in producing polymerization of polyethylene and other sterically unhindered alpha-olefin compounds, to treat the organic material with a combination of organo-metallic catalyst such as triethyl aluminum or the like and titanium tetrachloride, these latter two materials serving as catalysts to effect a condensation type polymerization such as conversion of ethylene monomer to solid state polyethylene polymer. The mechanism of this reaction is the subject of some considerable investigation and reliable investigators disagree as to the exact details of how polymerization is accomplished. In the present invention, I am not dependent upon any particular theory of the mechanics of reaction and do not wish to be bound by such considerations, it being sufficient that polymerization can be reliably performed under the conditions and according to the methods herein disclosed, which constitute a departure from the prior method of polymerization, these methods differing from previously followed methods by being substantially more reliable, safer, and more controllable.

It is an object of the present invention to provide numerous different processes for producing polymerization of olefinic materials which do not utilize the unstable, and difficult-to-handle pyrophoric organo-metallic materials and provide in their stead, a highly reactive metalloid reductant which is generated by an electrical arcing means.

Related to this foregoing object is the additional object of producing the metalloid reductant as it is needed, and in the presence of the organic material involved in reaction so that the appropriate amount of metalloid reductant is produced, the reaction rate is controllable by the extent of arcing to produce metalloid material. Also, since the reactivity of the metal is increased by reducing it to smaller particle size through electrical energy, and this energy is expended at the locus of reaction, there is a greater efficiency of operation when compared with previous methods of effecting polymerization because the catalyst is not produced as an intermediate product having more than or less than the energy requirements for effecting the polymerization reaction.

Another important feature of the present invention is that the "metalloid reductants" of my invention can be handled in whatever size is appropriate. It is a distinct advantage to handle metals and/or metalloids in a form other than finely subdivided form because they are then less reactive and less toxic and are generally less expensive. It is therefore possible, when using solid-state metalloid reductants, to provide them in sufficiently large size so that they can be handled relatively easily, and it is also possible to use metalloid reductant in its liquid-phase form for some reactions and especially so when the metalloid is a naturally occurring liquid material.

It is a further object of the invention to provide a metalloid reductant material which can be handled either in liquid or solid phase and while in a relatively inactive state, but is convertible to a second physical state to improve its reactivity, this being accomplished by means of an electric arcing action. As a result, the problems which were heretofore involved in using highly reactive organic compounds, are eliminated. Also, the reactants are not required to be heated since the reactivity of the metalloid substituent, is sufficiently high to render unnecessary these additional requirements involving heating of the reactants.

Another object of the invention is to provide novel processes for producing Grignard reagent or other organo-metallic compounds in which the metallic constituent, is reduced to a finely divided form by arcing and is supplied to the organo halide material by increments, one of the advantages of the arcing being that the metallic material is provided in controlled increments and is brought to a highly reactive condition to produce the reaction product. However, since the materials are provided by increments, the reaction is at all times controllable and, like the polymerization reactions, is free of hazard to the operator.

A further object of the invention is to provide a more effective metalloid reactant by effecting its physical state subdivision into colloidal-size particles in which the surface area to weight ratio is greatly increased and the material thereby rendered more reactive, this being accomplished by electrical arcing means.

Another feature of the invention is that a metalloid reductant can be used in either liquid or solid phase depending upon the physical properties of the metalloid reductant, and the solid phase, in turn, is usable in either particulate or solid rod form. This means that there is an almost limitless choice of materials available for syntheses and the reactions are all substantially equally controllable, and the materials proper are all substantially equally convenient to handle whether in liquid or solid phase form without presenting hazard to the user.

A further object of the invention is to provide a rapid, highly controllable and completely safe method of producing both polymerization and organo-metallic type reactions by reducing the metalloid reductant to an appropriately small size by means of arcing, either in the presence of or separately from the organic material reactant. A further feature of the invention is the greater efficiency of this described method because none of the energy is lost since subdivision of the material takes place, or can take place at the locus of the reaction, so that more of the energy expended in subdividing the particle is realized in carrying out the reaction thereby improving the efficiency.

Other objects and features of the invention will become apparent from a consideration of the following description, which proceeds with reference to the accompanying drawings, wherein.

In each of the to-be-described species of the invention, regardless of the composition or state (liquidus or solidus) of the metalloid reductant, I effect a fine dispersion of the material by producing arcing of electrical energy through the metalloid to reduce it to a fine colloidal size particle in which state it is more conducive to reaction with an organic material, either by serving as a catalyst for effecting its polymerization or by actual permanent or semipermanent combination with the organic material to form such compositions as Grignard reagent.

*Polymerization type reactions*

The present invention is especially adapted for, but is not limited to the polymerization of sterically unhindered alpha-olefinic materials which require catalytic promotion of condensation type polymerization. In this invention, the finely divided metalloid reductant is combined with a heavy metal compound such as $TiCl_4$; and, the two materials, acting in conjunction with each other as catalytic materials, effect polymerization of the monomer to a polymerized polymeric product.

I use the term "metalloid" to mean and include materials which can be subjected to arcing and are reducible to fine colloidal form where they act as electron donors or "reductants." Obviously a great many materials respond to these tests and all are generally usable with equivalent results. These materials obviously include more than the "metals" category materials, and encompass in addition many electron-contributing materials. Olefinic materials, which I have successfully polymerized by means of the present invention, are ethylene, propylene, isobutylene, 1-butene, styrene, cycloolefins, butadiene and mixtures of these materials. Obviously, there are numerous equivalent of these materials listed and I do not purport to make a complete listing of all those other materials which will obviously function in substantially the same manner to provide a polymerized product.

Figure 1:
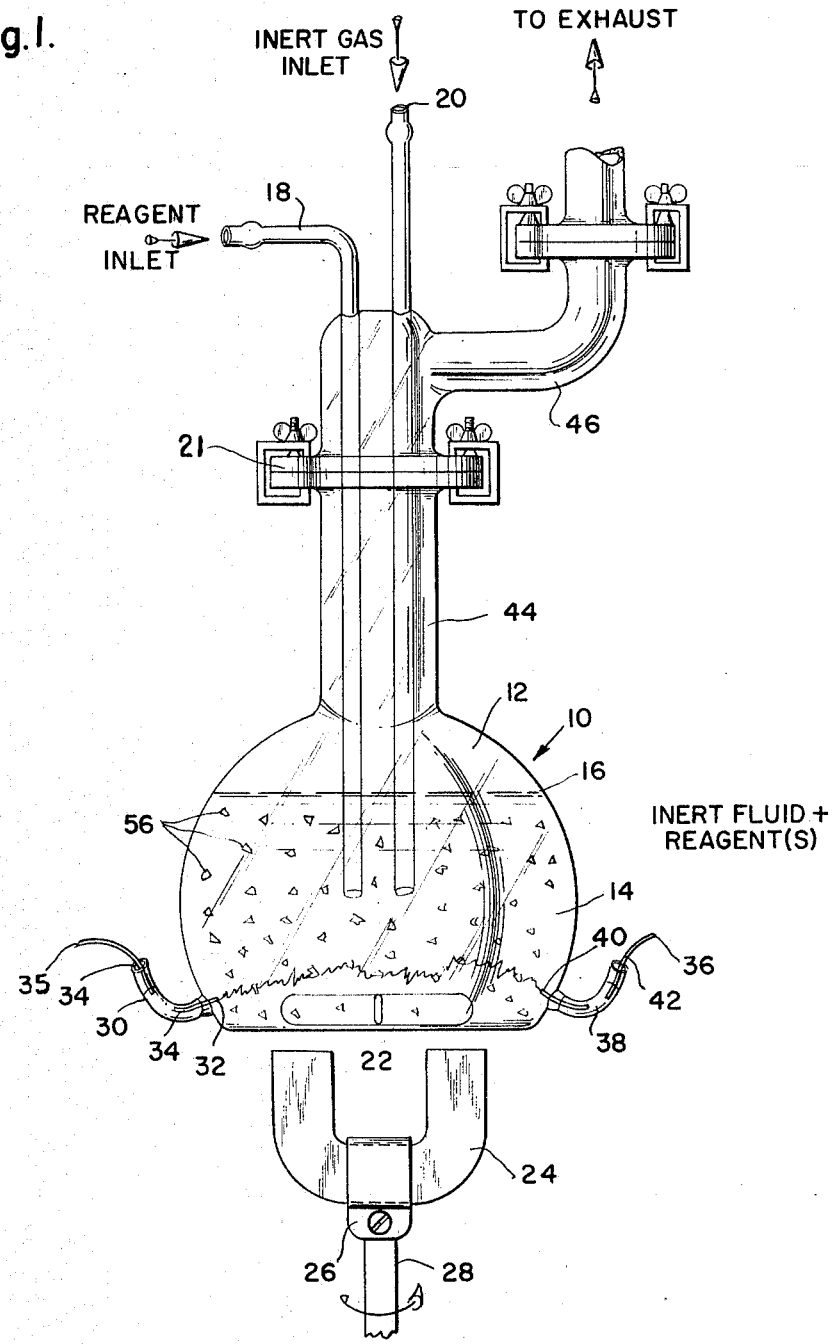
FIGURE 1 is an elevation view of one form of apparatus for practicing the invention in which the metalloid reductant is used in solid phase particulate or rod form.

With the apparatus shown in FIG. 1, I can use metals, or metalloids, as I refer to the generic grouping of materials hereinafter listed, in chip form or turnings, where the metalloid material is normally a solidus state material. A listing of those materials, by group, in the order of their reactivity which can be used in the apparatus of FIGURE 1 is as follows:

*Metalloid materials usable as catalysts in effecting polymerization in the order of decreasing reactivity*

Group I—Lithium, rubidium, potassium, barium, strontium, calcium, sodium
Group II—Magnesium, zinc, manganese, beryllium, mercury
Group III—Aluminum, tin, cadmium, titanium, gallium
Group IV—Arsenic, bismuth, chromium, cobalt, vanadium, nickel, iron, lead, silver
Group V—Carbon, silicon, sulfur, phosphorous, ferrosilicon It is also possible, to use amalgams, alloys, fused mixtures of these materials as desired, and carbides thereof. The particular size of the particles does not appear to be critical, and the metalloid dispersion which is created by arcing during the process is unaffected by the initial size of the particles. However, the degree of agitation which is required to keep the particles from coalescing during arcing is dependent upon the particle size. It is essential, of course, to keep the particles, regardless of their size, in a state of agitation or swirling motion so that they will not fuse into a solid network providing a continuous passage of current therethrough by means other than arcing. Should the particles fuse together, arcing will cease and the electrical current flow is merely wasted energy which heats the reaction mass and produces no useful results.

In general, the size of the particles determines the electrical requirements to produce and maintain the arc with the general relationship being that with the smaller particles it is easier to maintain a continuous arcing between the particles. With small fine chips, lower voltages are required to produce satisfactory results.

The degree of agitation is related both to particle size and viscosity of the fluid phase, i.e., the more viscous the liquid phase material, the more vigorous stirring is necessary to suspend the solid-phase chip metalloid material and maintain a dispersed solid phase of this material which is unfused by arcing.

APPARATUS I

The apparatus shown in FIG. 1 is one suitable form of equipment for practicing the invention having particulate solid phase metalloid reactant; it is designated generally by reference numeral 10, and it comprises a vessel 12 for receiving a liquid phase charge 14 which includes an inert fluid in addition to the olefinic monomeric material which is intended for polymerization. The liquid is charged to the level 16 but there is no critical consideration involved regarding the amount of liquid phase reactant which is added to the vessel beyond the capacity of the vessel to contain such charge.

The liquid may be charged to the vessel 12 through an inlet line 18 controlled in some suitable manner as by valves or the like (not shown). Generally, an inert fluid such as dry hexane or the like is used, and gaseous to liquid phase monomer is added through the line 18. Solid-phase metalloid material, in suitable chip size, is added to the liquid phase material through a charging line 20 or when the flange connection 21 is separated, and the mixture is then kept in a state of agitation by a stirring bar 22 which may consist of glass covered magnetic material and is rotated by a magnet 24 which is secured by clamp 26 to a rotatable shaft 28.

At one side of the vessel 12 is a mercury contact 30 having an electrode 32 passing through glass seal 34 and into the interior of the vessel 12. A second conductor 35 makes contact with mercury contact 30 at one end and is connected at its opposite end with an electrical source.

At the opposite side of the vessel is a second mercury contact 38 having a conductor 40 extending within the interior of the vessel 12 and corresponding with conductor 32 and a second conductor 42 which connects with mercury contact 38 and at the opposite end thereof connects with an electrical source of different polarity than conductor 35. After stirring is commenced by rotating the magnet 24, an electrical potential is developed between the terminals 32 and 40 so that when the swirling particles are brought into a favorable pattern there is produced an arcing through the liquid-phase material 14 and between certain ones of the suspended solid-phase particle, as for example in the direction and along the path indicated by the jagged line shown in FIG. 1.

There is formed, incidentally, to this arcing, a slight disintegration of the metalloid into a fine suspension of minute colloidal-size metallic particles which, having a vastly increased surface area to weight ratio, provides a suitable substitutionary material for the metal alkyls previously used in combination with heavy metal compounds for effecting polymerization of sterically unhindered olefinic monomers. The colloidal dispersions contain particles, which are highly reactive, are superior to the replaced heavy organo-metallic catalysts because of being non-pyrophoric, producible as needed and at the locus of the reaction to improve both efficiency and handling techniques, and the procedure is more economical to produce a given quantity of products.

There is a tendency during arcing to coalesce adjacent or contiguous metalloid particles which become fused one to the other, in which case, there is a continuous path for the flow of current between conductors 32 and 40, at which time arcing no longer occurs. To avoid this it is intended that the agitator 22 will mechanically break up any such fusion or tendency of fusion of the particles.

Since metalloid material in colloidal form is produced continuously at the locus of the reaction, substantially all of the electrical energy which is expended in effecting this reduction of size, is realized in producing polymerization; whereas much of the energy which is produced in mechanical ball milling or forming metal alkyl materials is not realized in effecting polymerization. Therefore, as an inherent feature of the present invention, I realize a more efficient method of producing polymerization. Should the reaction mass become overheated, it is possible to lead off some of the vapor phase material upwardly through the neck 44 to an arm 46 which conducts the vapor phase either to exhaust or to a condenser (not shown).

Agitation and arcing are both continued until polymerization has been carried out to the degree desired and the apparatus 10 is then deactuated. It is possible to construct the apparatus for continuous running by withdrawing reaction product from time-to-time from the vessel 12 and recharging the vessel with fresh metalloid material through line 20 or by breaking the flange connection; and, liquid-phase organic reactant can be added either continuously or as a single charge through line 18.

While the reaction occurs, it is possible to allow the reaction mass to reach a temperature higher than ambient temperature, or the vessel 12 can be surrounded by a cooling jacket or the like to withdraw any exothermic heat of reaction if such result is desired. These refinements of the process are entirely within the teaching of the present invention and can be provided as design dictates.

It should be pointed out that I do not find it necessary to raise the temperature of reaction mass in order to activate the reagents since the energy which is added to the colloidal metal particles, in the form of their dispersion and consequent high increase of surface area to weight, is in all cases sufficient to produce a polymerization reaction unaided by temperature considerations. This is an obvious economy over those processes and apparatus constructed with the assumption that heat is an essential requirement.

There is some reason to believe that the greater reactivity of the metal is obtained by the electrical energy which is converted to heat at the locus of the reaction or is "stored" in fine particles of the metalloid reductant. Obviously, local expenditure of energy rather than the use of energy in one of its other forms, as energy in the form of an intermediate chemical compound or as heat, motion, etc. is more efficient in the preparation of a desired species.

In some cases, I found it desirable to prevent the formulation of nitrides within the vessel 12 owing to the presence of nitrogen from atmospheric air. In this case, if formation of nitrides should be suppressed or eliminated, I have found it possible to charge the vessel 12 with an inert gas of Group VIIIb such as argon or neon in order to prevent the formation of nitride. I do not mean by this statement that it is necessary in all instances to provide a protective atmosphere of this type but merely mention it as one of the procedures which I follow. I have also found it advisable, in some instances, to exhaust the vessel 12 and in other instances, to purge the volume of air within vessel 12 by means of ethylene gas, particularly when the polymer produced is polyethylene.

Without intending to be limited to these following specific values, I have found, that electrical arcing is satisfactorily obtained, with a metalloid reductant, cut from 0.010 inch of aluminum foil, using an electrical current of 5–40 amperes at 10–110 volts, it being understood that it is the size of the metalloid reductant chips, flakes or other shape particles which determine the current requirements for arcing. The general rule, as mentioned, is that small fine chips require low voltage and large electrodes require high voltages. I further found it to be the case that alternating currents of very high frequency such as $10^6$ or $10^9$ cycles per second produce dispersed metalloid reductants of smaller average diameter than those using alternating currents of a conventional 60 cycles per second frequency. For this reason, it is possible to increase the frequency of the current and obtain a direct measure of reactivity of the metalloid particles because of the general rule that the higher the frequency, the smaller the colloid particle and consequently the greater the reactivity.

The heavy metal compounds which are used in combination with the metalloid dispersion are compounds of elements of Groups IVa through VIIIa of the Periodic Table and these compounds can be halides, oxyhalides, complex salts of such halides with other halides of the more electropositive elements as Group Ia and ammonium halides, salts of these heavy elements with organic acids and polybasic acids, heavy metal oxides, ethers, etc. and combinations thereof. These heavy metal compounds are co-catalysts with the metal dispersion and evidently react in the same manner with the metal dispersion to effect polymerization as did the previously used metal alkyl compounds which are replaced in the present invention by the fine metal dispersion.

The heavy metal compound can vary considerably in relation to the colloidal metal and for polymerization purposes, this ratio of metalloid reductant to heavy metal compound in parts by weight can vary.

It should now be evident that the present invention offers substantial improvement over the previously followed process of producing polymerization since the materials used are non-pyrophoric and present substantially no hazard in handling. This should be contrasted with previously followed practices of using metal compounds which are very reactive, are almost always pyrophoric and involve hazardous procedures in handling. If the results of this invention were to be emulated by mechanical means, i.e., by ball milling, the material would need to be reduced to a very finely divided shape by a lengthy process and the procedure would be expensive, time consuming, and add considerably to the complexity and cost of the process. In the present invention I do not follow a multistage or extensive series of handling of the material and consequently I enjoy greater efficiency, less hazards of toxicity and because the material remains in a rather bulky condition until actually reduced, it can be safely handled, is non-pyrophoric and relatively easy to handle.

Figures 2, 3:
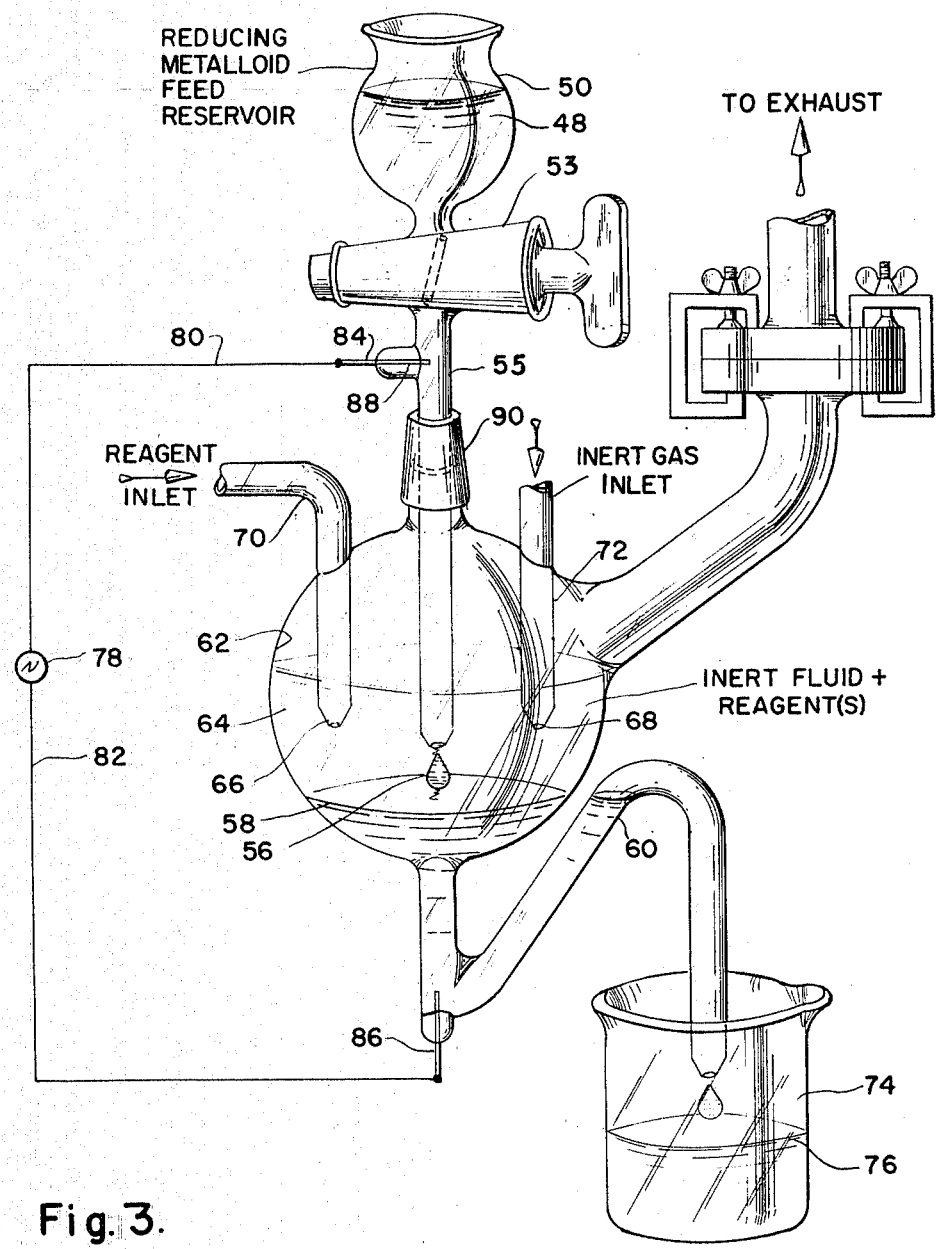
FIG. 2 is a second form of apparatus for practicing the processes of my invention in which the metalloid reductant is in liquid phase; and, FIG. 3 is a schematic wiring diagram showing the circuit for effecting arcing of the metalloid materials and their consequent dispersion.

Referring to FIG. 3, there is shown the electrical system for effecting arcing including a source of voltage source 48 having two conductors 49, 51 connected to opposite terminals of the voltage source 48 and having a condenser 50 connected in parallel with the arc path 52 through the suspended reductant particles 56 to complete the circuit. A resistor 54 is included in parallel with the condenser 50.

*Specific examples of polymerization using particulate solid phase reductant and the apparatus FIGURE 1*

The following are selected specific examples of metalloid reductants which have been used in accordance with the foregoing described procedure and are typical of the materials shown in Groups I–V.

EXAMPLE I

Fifteen parts by weight of magnesium chips were made from turnings cut at a ¼" x ¼" x ¹⁄₂₀" and were placed in the vessel 12, FIG. 1, together with 400 parts by weight of dry hexane and a 2 inch agitator 22 was used as a stirring bar. Ethylene was sparged into the reactor to clear the contaminants from the line. The vessel was then purged with dry argon for a time sufficient to displace all other gases from the reactor. The electrical arcing current used was 110 volts alternating current, 60 cycles per second, 15 amperes with a 600 watt resistor 54 (FIG. 3) in series with the arc and a 1 microfarad condenser 50 was provided in parallel with the arc 52. The agitator was stirred, and arcing began. The agitator was driven by an air motor connected to an 80 p.s.i. supply and regulated by means of a needle valve. This valve was adjusted until the arc was steady. The arcing formed a dense gray cloud of finely dispersed magnesium in the hexane. To this was now added 0.1 milliliter titanium tetrachloride, the arcing continued for an additional twenty minutes. The color of the suspension in the reactor became a dark olive color during this interval. A flow of ethylene then produced a tan slurry of polymer. The current was turned off, the agitation stopped, the gas lines dismantled and the slurry poured into methanolic HCl, stirred and filtered. A finely pulverized off-white polymeric product was thereby obtained which after drying was molded into a flat sheet.

The diluent added to the vessel 12 and forming part of the liquid phase 14 is selected from a wide range of materials. The only necessity is that it be inert and dry. When preparing catalysts for use in the polymerization of alpha-olefins, the following materials can be used: dry hexane, dry heptane, dry mineral oil, dry diesel fuel, dry benzene, dry "Stoddard solvent" have all been successfully used.

EXAMPLE II

To the vessel 12 was added 15 grams magnesium turnings as described in Example I. The vessel 12 was then flushed with ethylene to clear the line, of nitrogen, while the balance of the assembly was made. Three hundred grams of hexane was added, and 3.2 grams n-butyl chloride. Sparging was continued until all the contaminating gases were removed, as judged by inserting a hypodermic syringe containing $TiCl_4$ into the exit Bunsen valve and noticing if fuming took place. When the atmosphere was inert, 0.2 milliliter of $TiCl_4$ was added, the agitation started, and the current applied, using current as stated in Example I. The arcing produced clouds of dispersed material and after one-half hour of arcing a very dark brown, almost black slurry had been formed. Ethylene was again introduced and a tan, thick slurry formed from which moldable polymer was isolated by the isolation procedure given in Example I.

EXAMPLE III

In the reactor described for use in arcing solid metalloid reductants was charged 38 grams of iron particles prepared by cutting pieces of turnings from a wrought iron bar into fragments approximately 1/4 x 1/8 x 1/16 inch, and 400 grams light paraffin oil. (Drug store light mineral oil.) Since magnetic stirring is ill-suited for use with iron in this reactor, no stirring bar was included, and the horseshoe magnet removed from its usual location beneath the reactor. The gas lines were purged, and then the vessel sparged with argon to displace all contaminating gases. The argon flow was then adjusted so as to keep the iron particles in swirling motion. The current and $TiCl_4$ addition is the same as Example I. The arcing time is 1/2 hour and polymer recovery method is the same as Example I.

EXAMPLE IV

Into the vessel 12 was charged 22.2 grams of aluminum flakes cut from .005 inch thick aluminum sheet into pieces approximately 1/4 x 1/8 inch rectangles. The magnetic stirring bar was at that time stationary. I then charged about 400 grams of light paraffin oil into the vessel 12 which was thereafter closed. Ethylene aand argon lines were purged, the ethylene was shut off and the vessel purged with argon for twenty minutes. Agitation was then started through the magnet drive 24 by means of an air motor which was operated under 80 p.s.i. air pressure system regulated by means of a needle valve. The source of electricity was 110 volts, 15 amperes, 60 cycles per second alternating current and had a 600 watt resistor in series with the arc gap and a 1 microfarad condenser as in Example I.

The arc was maintained in spasmodic action by adjusting the rate of agitation. The charge was arced for about thirty minutes and this was sufficient to produce a gray cloud of aluminum dispersion in the fluid. After the arcing, 0.1 milliliter of titanium tetrachloride was added by means of a hypodermic syringe and upon the addition of this heavy metal compound the gray metal suspension became a dark brown color. Ethylene was sparged through the catalytically active material thus forming a tan polymeric slurry. After four minutes, the ethylene sparging was stopped, the argon was shut off and the reactor contents emptied into two liters of methanolic HCl whereupon the precipitate whitened considerably in color. The polymer was then separated by filtration, rewashed with fresh methanolic hydrochloric acid, again filtered, washed with methanol, filtered and dried at 60° C. under vacuum. The polymer was an off-white powder weighing 1.7 grams and could be molded under heat and pressure to form a sheet. The non-colloidal recoverable aluminum weighed approximately 21.3 grams.

EXAMPLE V

In an experiment similar to that of Example IV, 23 grams of aluminum chips of the type described were placed in the reactor with the agitator and 400 grams of light paraffin oil and arcing was produced similarly to that described except that the 0.1 milliliter of titanium tetrachloride was added before arcing. After the arcing process had been carried out for fifteen minutes, ethylene was sparged through the dark colored suspension of catalytically active species and the alpha-olefin polymerized to form a tan slurry from which polymer was isolated in the manner described in Example IV.

EXAMPLE VI

This example is similar to that described for Example IV except that 22.5 grams of aluminum and 5 milliliters of n-butyl chloride were placed in the vessel 12. There was then added 400 grams of light paraffin oil. Arcing was carried out for about twenty minutes. Then 0.5 milliliter of titanium tetrachloride was added forming a dark tan suspension of catalytic species. Ethylene was sparged through the suspension. The alpha-olefin polymerized, the slurry was treated in the manner described in Example IV to recover the polymer therefrom.

EXAMPLE VII

This procedure carried out was similar to that for Example VI except that the aluminum chips, the n-butyl chloride and the titanium tetrachloride were all introduced into the vessel before initiation of the arcing procedure. After arcing for fifteen minutes, the introduction of ethylene formed a dark brown slurry. The polymer was then isolated by the method described in Example I.

EXAMPLE VIII

This example is similar to that of Example VII except that ethylene was used as an atmosphere in the reactor by sparging with it before and during the arcing interval which was fifteen minutes duration. This procedure formed a large amount of olive colored product which was worked in the manner described in Example I.

EXAMPLE IX

In this example, 35 grams of titanium chips, made from titanium metal turnings cut into pieces approximately 1/4 x 1/16 x 1/32 inch, were placed in the vessel described in Example I together with about 400 grams of dry benzene and 2.0 grams of titanium tetrachloride added after the lines and reactor had been cleared of reactive gases by purging with dried argon. The agitator was started and the electricity turned on. Arcing was maintained for about two hours and then stopped. Ethylene sparged through the reactor, and thus developed a dark blue color. From this mixture there was isolated an off-white polymeric alpha-olefin and a dark blue oil which slowly crystallized to a blue solid. The polymer was similar to that described in the previous examples. The blue co-product, suspected to be an azulene, was discovered after much investigation to be an undetermined material.

EXAMPLE X

In this procedure, the reactor described in Example I was charged with about 400 grams of dry heptane, 27 grams of titanium metal turnings as described in Example IX, and 5.0 milliliters t-butyl chloride. The argon and ethylene lines were purged and the ethylene shut off. The argon was used to purge the reactor until all contaminating gases were removed. The agitator was started and the electrical supply turned on and arcing began. After arcing for 30 minutes, 1.0 milliliter of titanium tetrachloride was added, and the formerly steel-gray dispersion of metal became brownish black in color. Arcing was continued for an additional fifteen minutes, then ethylene introduced. This caused formation of a light brown polymer slurry from which polymer was recovered by the method described in Example I.

EXAMPLE XI

This experiment was identical to that described in Example III, except that the titanium tetrachloride was added before arcing. The arcing process produced a catalytically active species; sparging thereof with ethylene produced polymer which was isolated as described in Example I.

EXAMPLE XII

This experiment was carried out identically to Example VII, except that 0.5 milliliter of bromobenzene was added instead of n-butyl chloride and it was added before arcing commenced. After arcing for 45 minutes, the titanium tetrachloride, 0.1 milliliter, was added, producing the catalytic species.

EXAMPLE XIII

The vessel 12 was charged with 23.6 grams of graphitic carbon obtained by crushing lead from No. 1000 pencils made by The Joseph Dixon Crucible Co., Jersey City, New Jersey, together with 400 grams of light paraffin oil. The lines were then purged, nitrogen being used as the inert gas. The ethylene supply was turned off and the vessel purged with nitrogen. After the ethylene supply was turned off and the vessel purged, the top vent was regulated by a Bunsen valve which permitted only one-way gas flow. There was then added 0.2 milliliter of titanium tetrachloride by means of a hypodermic syringe and the agitation began. The agitator was driven by an air motor supplied by a 40 p.s.i. air pressure system and regulated by a needle valve. The electricity was 110 volts, 15 amperes, 60 cycles per second alternating current with a 600 watt resistance in series with the arc gap and a 1.0 microfarad condenser in parallel with the arc gap was turned on and arcing begun. The color of the fluid changed from white to black with a purple tint. After arcing for 45 minutes, ethylene was sparged through the reactor, causing formation of a brown slurry of polymer. The reactor contents were removed and poured into methanolic hydrochloric acid, filtered, washed with methanol, filtered and dried. The dry, gray polymer was dissolved in boiling decalin and filtered to remove the metalloid reductant. The filtrate was poured into methanol, the thus precipitated polymer collected, washed and dried under vacuum at 60° C. The polymer was molded into a sheet by conventional compression molding techniques. The recovered carbon was washed and dried and weighed 20.1 grams.

EXAMPLE XIV

In an experiment similar to Example XIII, the arcing was continued for two hours. This changed the purple tint to a brown color and produced a very active catalytic species rapidly producing a very large volume of polymer when sparged with ethylene. The polymer was worked up in the same manner as described in Example XIII.

EXAMPLE XV

In an experiment similar to that of Example XIII, after arcing, an aliquot of 5 milliliters of the purple colored catalyst species was removed under nitrogen, and 1 milliliter of this transferred to a vial, and 3 milliliters of styrene monomer added. The mixture was swirled with no change taking place for several minutes. After this initial period, polymerization took place very rapidly with the evolution of much heat, turning solid. The polystyrene was dissolved in 1,4 dioxane, filtered and precipitated in methanol, collected on a filter crucible, washed and dried under vacuum at 60° C., and weighed 2.7 grams.

EXAMPLE XVI

Into the reactor was placed 30 grams of ferrosilicon crushed into pieces of about 10 mesh size, and 400 grams of light paraffin oil. The ethylene and argon lines were flushed out and argon then used to purge the reactor. Then 0.2 milliliter of titanium tetrachloride was introduced by means of a hypodermic syringe. The agitator was started, and the electrical system, as described in Example XIII, energized and agitation was adjusted to maintain arcing as steadily as possible. After arcing for about 45 minutes, ethylene was sparged through the reactor, polymerizing to form a brown slurry which was worked up in the manner described in Example XIII.

EXAMPLE XVII

The vessel 12 was charged with 30 grams of 10 mesh ferrosilicon, 300 grams of dry hexane, 5.0 grams pyridine, 1.6 grams bromobenzene, 2.0 grams anhydrous magnesium chloride. The atmosphere was displaced by nitrogen and agitation and arcing begun and maintained as described in Example XIII. Arcing was then carried out for 1½ hours. The agitation and arcing was stopped, and an excess of carbon dioxide snow added to the reactor to effect carbonation. The mixture was dumped into 500 milliliters of dilute (10%) hydrochloric acid. The benzoic acid thus produced was recovered by the usual laboratory methods. The yield was 0.92 gram, and the melting point was 120.6–121.2° C.

EXAMPLE XVIII

In another experiment, the vessel was charged with 27 grams of 10 mesh ferrosilicon, 400 grams of light paraffin oil, 5 milliliters of n-butyl chloride, and 5 grams of anhydrous magnesium chloride. The top of the reactor was emplaced, the ethylene line flushed with argon and the vessel purged with argon. Agitation was started, and the electric current turned on. Arcing was initiated as described in Example XIII. The arcing was continued for about two hours. Then 0.1 milliter of titanium tetrachloride was introduced by means of a hypodermic syringe, thus forming a colored disperoid. The arcing and agitation was continued for an additional 5 minutes, then ethylene sparged through the fluid. The agitator and the electricity were stopped when the slurry became thick. The polyethylene was isolated in the manner described in Example XIII.

*Process using solid phase metalloid in tube or rod form*

Those metalloid materials which can form solids, can be provided, instead of in particulate form, in solid rod or tube form, resembling lines 18 and 20 in FIG. 1 and the distance between the ends of the electrodes adjusted to form a gap which, when connected with opposite terminals of an electrical potential, having either direct or indirect current voltage, will produce an arcing thereacross so that the ends of the electrodes, by process of attrition, will generate a colloidal-size metalloid reductant which is dispersed within the liquid phase 14 and, together with the heavy metal compound to effect condensation polymerization of sterically unhindered alpha-olefin monomer. When rods are used, and mechanically adjusted, the arc is maintained by controlling the displacement or gap between the ends of the rods. The mechanism and means for maintaining the gap and therefore the controlled arc, is well known from the field of lighting, motion picture projection, electrometallurgical applications, and so forth.

*Apparatus and process using liquid phase metalloid materials for effecting polymerization*

Referring next to FIG. 2, the metalloid reductant can be used in liquid phase as distinguished from solid phase particulate or solid rod form, in which case, the liquid phase material, as for example mercury or the like 48, is located within a reservoir 50 and is metered through a plug cock 53 and feeder tube 55 to provide a number of discontinuous drops 56 in order to provide at least some gap between the drop 56 and the metalloid material collecting at 58. The collected material 58 at the bottom of the vessel 62 includes a gooseneck overflow line 60 which maintains a seal within the vessel 62. The vessel 62 is charged with an inert solvent 64 which is at the level indicated in FIG. 2 so that the end of tube 55 is immersed as well as the ends 66 and 68 of charge lines 70 and 72, respectively. The charge line 72 provides an inlet for an inert gas which purges the system of oxygen and other objectionable gases and line 72 provides an inlet for reagent such as monomeric ethylene or the like.

The overflow of metalloid material is passed through gooseneck 60 into a container 74 which is already partially filled with metalloid reactant 76 which can be recharged from time-to-time to the reservoir 50.

An electrical potential is imposed across the drop 56 to effect arcing therethrough as indicated by the jagged line bridging the gap between drop 56 and metalloid collected at 58. The electrical potential is generated by means of a voltage source 78 having conductors 80 and 82 connected with electrodes 84 and 86, respectively. The electrode 84 is sealed within a glass member 88 and provides that the electrode will make contact with metalloid material within tube 55. Electrode 86 of opposite polarity makes contact with metalloid material 58 which is collected at the bottom of the vessel 62 and, there being a gap between the electrodes 84 and 86 which is bridged in part by drop 56, the dielectric of the fluid 64 within the vessel will permit arcing through the drop 56 which is of a size, and drops at a rate to form a series of gaps which are intermittently gapped by arcing which produces a satisfactory rate of electrical arcing thereby producing a dispersion of at least a portion of the metalloid into a fine colloidal size conducive to effecting polymerization of ethylene or the like introduced through line 70 into the inert liquid phase material 64. The rate of forming the drops, and the size of the gap is controlled by plug cock 53 which is adjusted to control the rate of forming the drops 56 and the tube 55 is adjusted upwardly or downwardly through the rubber seal stopper 90 to regulate the gap size. The aperture at the end of tube 55 is the main control for the size of the drops 56. With these parameters available, it is a simple matter of adjustment for those skilled in the art to determine the operating conditions required for satisfactory arcing in accordance with the frequency, voltage and current provided by source 78. Agitation of the inert liquid phase 64 can be provided or not depending on the particular reaction involved.

EXAMPLE I

*Liquid phase metalloid, polymerization reaction*

Marcury was added to the reservoir 50 and also to vessel 62, the charge of mercury within vessel 62 being sufficient to fill the bottom portion of the vessel and the overflow gooseneck 60. The dropping tube 55 was likewise filled and then dry hexane, which had been distilled from sodium was charged to the vessel 62 to the level indicated in FIG. 2. The vessel was then sparged with argon through line 72 and arcing was initiated by supplying potential to electrodes 84 and 86 from a 110 volt, 15 ampere, 60 cycle per second alternating current which had a 600 watt resistance in series with the arc gap and a 1 microfarad condenser in parallel with the arc gap (FIG. 3). The drop tube 55 was then adjusted vertically and the plug cock 53 adjusted so that there was slowly dripped from the tip of the tube 55 a discontinuous stream of droplets 56 and arcing was then obtained after the correct vertical displacement was established.

An arc formed and was broken every time a drop fell from the tip of the drop tube 55. This arcing under hexane produced a dense gray cloud of dispersed mercury which formed in the solvent and to this was added 0.1 milliliter of n-butyl bromide and arcing continued at the rate of about two drops per second for a period of thirty minutes. The arcing was then stopped and 0.04 milliliter of titanium tetrachloride ($TiCl_4$) was added, and the vessel was sparged with ethylene. A cloudy brown precipitate of polymer was then formed. The mercury and other reactor contents were withdrawn therefrom, unconverted mercury was then separated and a hexane-polymer-catalyst slurry was poured into methanolic hydrochloric acid. The polymer which is purified in this manner was then filtered, rewashed with methanol, filtered and dried under vacuum at 60° C. and the polymer so produced was then moldable into sheets under appropriate conditions of heat and pressure.

EXAMPLE II

In an experiment similar to that described for Example I, all of the components, i.e., the mercury, the n-butyl bromide and the titanium tetrachloride were used in the quantities specified for Example I and were present at the initiation of arcing. After the arcing process had been carried on for about 25 minutes, the brown-chartreuse suspension was sparged with ethylene. A cloud of polymer formed in the slurry from which there was isolated the polymeric material in the manner described in Example I.

PREPARATION OF GRIGNARD REAGENT

The metalloid reductant is sufficiently reactive, not only to produce polymerization, but it will also combine with organo-halides to form organo-metal-halo constituents generally referred to as Grignard reagents. In this synthesis, I generally charge the vessel as shown in FIG. 1 with an inert liquid phase such as tertiary amine, ethers of one type or another (including polyethers), tetrahydrofuran, or the like. The alkyl halide, may be a bromide or chloride but less stable or less reactive halides can also be used.

Those organo-halides which I have found suitable are those including alkyl, aryl, aralkyl, monochlorides, and monobromides, alkyl dibromides, alkyl dichlorides, aralkyl dichlorides and dibromides, tribromides and chlorides, tetrabromides and chlorides and many corresponding iodides and certain other halogen-like compounds. Halides in which the halogen is a substituent with an aromatic ring, such as chlorobenzene can be used. Those compounds of which I have had the most experience are n-butyl bromide, 1,2,3,4-tetrabromobutane, t-butyl chloride, n-butyl chloride, benzyl chloride, chloroform, bromoform, carbon tetrachloride and acetylene tetrabromide. With these organo-halides, I have used magnesium in chip form, and produce agitation of the chips by means of the agitator 22 (FIG. 1) which is rotated by the horseshoe magnet 24 to prevent the chips from fusing together, I then apply an electrical potential across electrodes 35, 36 to effect arcing, and in the process of doing so generate a quantity of colloidal size metalloid materials the same as previously described which, will undergo reaction with the organo-halide to produce Grignard reagent. The metalloid material can be reduced to colloidal, more reactive form either before, during or after charging of the container with the organo-halide material. When the reaction is completed, the arcing is discontinued and the unreacted organo-halide metal, and inert solvent are separated from the Grignard reagent according to conventional well known separation procedures.

The Grignard reagent is prepared quite successfully by the described process, because only a small portion of metalloid reactant is available during any one time and therefore the reaction will not proceed in surges, but will proceed incrementally. Also, because only a portion of reactant is available at any one time, there is no difficulty of temperature control of the reaction mass. Another advantage which I have found, is that the colloidal size metalloid reactant, being highly reactive, but present in small amount at any one time, will proceed to unite with the organo-halide almost immediately, and therefore the rate of reaction is highly controllable. All of the advantages described for polymerization are also present in that the energy which goes into subdividing or reducing the metalloid to a smaller shape, is brought about at the locus of the reaction and therefore the energy which is introduced to the system, is used more efficiently, rather than proceeding through an intermediate material.

The following specific example will illustrate how the invention is used in preparing one specific form of Grignard reagent. From this example, suitable changes will be apparent to those skilled in the art as to how other Grignard reagent material can be formulated.

SPECIFIC EXAMPLE OF GRIGNARD REAGENT

Into the reactor was placed 12.0 grams magnesium chips, 5 milliliters chlorobenzene, 300 grams "Stoddard solvent 190-205" (a proprietary name for a hydrocarbon fraction), 1 milliliter of pyridine, and inert gas, sparging, arcing and agitation started as described in Example I. After arcing for one hour, the agitation, inert gas flow, and current was turned off. The contents of the reactor carbonated with solid carbon dioxide snow. Then 100 milliliters de-ionized water was added and 50 milliliters of concentrated (36%) hydrochloric acid. The oil and water layers were separated and the water layer treated with $BaCl_2$ solution until all the acid was precipitated. This barium salt was washed and dried, weighed 4.1 grams and then placed in 100 milliliters of de-ionized water and slurried therein. Sulfuric acid was added to liberate the acid, which was then recrystallized, dried, weighed 1.8 grams, melting point 121° C.

Although the present invention, has been described in connection with only few selected example processes and apparatus embodiments useful for catalyzing a condensation-type polymerization and for synthesizing Grignard reagent, numerous other reactions will subject themselves to those skilled in the art. It is intended that the present invention will include such other reactions which are indicated and proceeding from the highly advantageous method of generating a metalloid reactant which, is highly reactive, and is more susceptible to handling as compared with the previously used pyrophoric materials. It is intended, therefore, that such revisions and adaptations of the present invention, as incorporate the herein disclosed principles, will be included within the scope of the following claims as equivalents of the invention.

I claim as my invention:

1. A process for producing a metalloid reductant in a reactive dispersed form, comprising the steps of disposing a metalloid material within an inert fluid dispersing phase which will not react with the metalloid material, the metalloid material as disposed in the dispersing phase being in unreacted form and including an element selected from the group consisting of lithium, rubidium, potassium, barium, strontium, calcium, sodium, magnesium, zinc, manganese, beryllium, mercury, aluminum, tin, cadmium, titanium, gallium, arsenic, bismuth, chromium, cobalt, vanadium, nickel, iron, lead, silver, carbon, silicon, sulfur and phosphorus, and arcing a quantity of electrical energy through the metalloid material within the inert dispersing phase, the magnitude of the electrical energy being sufficient to disintegrate the metalloid material into finely divided unreacted form.

2. The process of claim 1 wherein the metalloid material is in a form selected from the group consisting of the elemental form, amalgams, alloys, fused mixtures and carbides.

3. The process for polymerization, comprising the steps of disposing a metalloid material within an inert fluid dispersing phase which will not react with the metalloid material, the metalloid material as disposed in the dispersing phase being in unreacted form and including an element selected from the group consisting of lithium, rubidium, potassium, barium, strontium, calcium, sodium, magnesium, zinc, manganese, beryllium, mercury, aluminum, tin, cadmium, titanium, gallium, arsenic, bismuth, chromium, cobalt, vanadium, nickel, iron, lead, silver, carbon, silicon, sulfur and phosphorus, arcing a quantity of electrical energy through the metalloid material within the inert dispersing phase, the magnitude of the electrical energy being sufficient to disintegrate the metalloid material into finely divided form, reacting said finely divided metalloid material with a co-reagent comprising a compound of a heavy metal selected from Groups IVa through VIIIa of the Periodic Table, and bringing said finely divided metalloid material and said co-reagent into contact with a polymerizable hydrocarbon with an olefinic linkage to effect polymerization thereof.

4. The process of claim 3 wherein the polymerizable olefinic-linkage containing material is introduced into said inert dispersing phase while the metalloid material is being disintegrated by the passage of electrical energy therethrough, whereby the polymerization occurs in situ.

5. The process of claim 3 wherein the metalloid material comprises aluminum.

6. The process of claim 3 wherein the metalloid material comprises tin.

7. The process of claim 3 wherein the metalloid material comprises lithium.

8. The process of claim 3 wherein the metalloid material comprises a liquid mixture of sodium and potassium.

9. The process of claim 3 wherein the co-reagent comprises a compound of titanium.

10. The process of claim 3 wherein the co-reagent comprises a compound of vanadium.

11. The process of claim 3 wherein the polymerizable material comprises ethylene.

12. The process of claim 3 wherein the polymerizable material comprises propylene.

References Cited by the Examiner

UNITED STATES PATENTS

| | | | |
|---|---|---|---|
| 1,061,786 | 5/1913 | Siebert | 204—323 |
| 1,610,592 | 12/1926 | Rodman et al. | 204—164 |
| 1,787,659 | 1/1931 | Bischoff | 204—157 |
| 2,931,792 | 4/1960 | Aries | 260—94.9 |
| 3,211,520 | 10/1965 | Harnisch | 204—164 |

FOREIGN PATENTS 820,263    9/1959    Great Britain.

OTHER REFERENCES

Migrdiehian, V.: Organic Synthesis N.Y. Reinhold, 1957, p. 544.

JOSEPH L. SCHOFER, *Primary Examiner.*

M. LIEBMAN, D. E. OLSON, F. L. DENSON,
*Assistant Examiners.*